United States Patent [19]

Baumann

[11] Patent Number: 4,812,047
[45] Date of Patent: Mar. 14, 1989

[54] APPARATUS FOR THE GRAVIMETRIC DOSING OF FLOWABLE PRODUCTS

[75] Inventor: Rudolf Baumann, Osterburken, Fed. Rep. of Germany

[73] Assignee: Azo-Maschinenefabrik Adolf Zimmermann GmbH, Osterburken, Fed. Rep. of Germany

[21] Appl. No.: 869,241

[22] Filed: Jun. 2, 1986

[30] Foreign Application Priority Data

Jun. 8, 1985 [DE] Fed. Rep. of Germany ....... 3520657

[51] Int. Cl.⁴ ............................................. B01F 15/02
[52] U.S. Cl. ..................................... 366/141; 222/77; 222/399; 366/152
[58] Field of Search ........................ 366/18, 19, 16, 17, 366/152, 141, 191; 222/77, 394, 399; 141/290, 83; 177/1, 116, 66, 60, 59, 64, 103

[56] References Cited

U.S. PATENT DOCUMENTS

| 1,651,866 | 12/1927 | Bowers | 366/191 |
| 3,058,622 | 10/1962 | Ballestra | 366/18 X |
| 3,807,433 | 4/1974 | Byrd | 141/290 X |
| 4,218,145 | 8/1980 | Brock et al. | 366/18 |
| 4,435,081 | 3/1984 | Del Fabbro | 366/18 |
| 4,653,568 | 3/1987 | Baldelli | 366/141 X |

FOREIGN PATENT DOCUMENTS

| 972193 | 6/1959 | Fed. Rep. of Germany | 366/18 |
| 818384 | 8/1959 | United Kingdom | 366/18 |

Primary Examiner—Harvey C. Hornsby
Assistant Examiner—Scott J. Haugland
Attorney, Agent, or Firm—Antonelli, Terry & Wands

[57] ABSTRACT

An apparatus for the gravimetric dosing of flowable components, whereof at least one is a liquid, e.g. for producing mixtures, has a storage container and a weighing container for each component, together with a feed line connecting said container, as well as a weighing frame with a balance for all the weighing containers and a discharge line for each weighing container leading to a mixing device. Each discharge line contains a shutoff valve near the mixing device. The weighing containers are filled with the individual components up to a predetermined level and then each component is discharged from the weighing container into the mixing device in the subtraction process. This permits an accurate dosing of components with different physical characteristics and different flow behaviors, even in the case of high viscosity liquids.

6 Claims, 1 Drawing Sheet

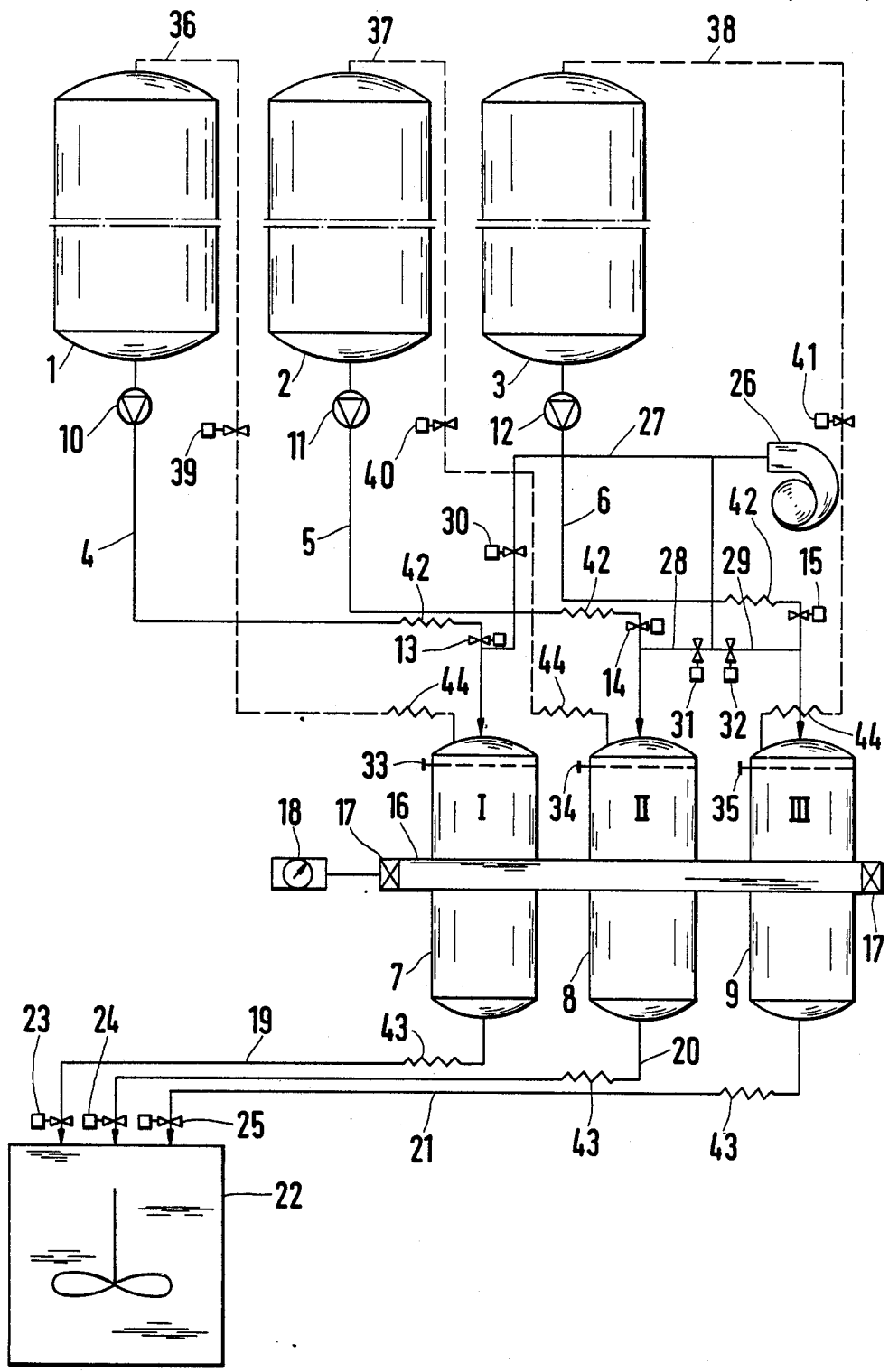

APPARATUS FOR THE GRAVIMETRIC DOSING OF FLOWABLE PRODUCTS

BACKGROUND OF THE INVENTION

The present invention relates to an apparatus for the gravimetric dosing of flowable product components, at least one of which is a liquid, for producing mixtures with optionally changing weight proportions of the components, comprising storage containers containing the components, a balance with weighing containers connected to the storage containers through feed lines, a mixing means connected to an outlet of the weighing container, as and shutoff valves for interrupting the flow of flowable product components following the weighing process.

In process engineering considerable importance is attached to producing mixtures of flowable products with different flow behavior. The mixture can be produced batchwise or continuously and separate mixers can be provided, from which the mixture is drawn off and supplied for further processing, or the mixture can be directly produced in a processing machine, e.g. an extruder or the like. The aforementioned term mixing means is understood to mean any type of mixer or processing machine in which such mixtures are produced.

In mass production, the individual components are generally maintained in storage containers, from which they are supplied to a weighing container and are then supplied to the mixing means following weighing. All the components can be successively fed into the weighing containers in an addition process in accordance with the mixing formulation and can then be jointly discharged in the mixing means when the total weight is reached.

A known apparatus of the latter type (DE-OS No. 20 34 983) is used for bringing together and mixing fluid bulk materials of different types and/or physical characteristics. Directly upstream of the separating container a shutoff valve is provided in each feed line. In order to achieve an accurate dosing, even in the case of very small dosing quantities, the shutoff valves are positioned substantially equidistantly to the inlet into the weighing container, so that the tailings remaining in the line following the shutoff are the same for all the components. This process, particularly the introduction into a single weighing container presumes an approximately identical physical behavior of the components with regards to feedability, flowability, etc., so as to be able to use the same feeding technology for all components, and ensure a completely satisfactory emptying of the weighing container following each weighing process.

It is also known to separately weigh each individual component and then to bring the components together again following the weighing process, possibly this only taking place in the mixing means. Each storage container or a larger weighing container with removal means is then associated with a balance, which determines the initial weight and maintains the removal means in operation until the desired component quantity is discharged, whereupon the removal means is stopped. This clearly leads to a considerable constructional expenditure. However, in many applications, the only possibility is dosing, particularly if the components have widely differing physical characteristics, such as is e.g. the case with mixtures of liquids having widely varying viscosities or flowable components on the one hand and liquid components on the other with possibly greatly differing viscosities. Particularly in the case of high viscosity liquids problems occur due to the limited flow rate and strong dependence of the latter on the geometrical characteristics (sloping surfaces and lines compared with vertical surfaces and lines).

SUMMARY OF THE INVENTION

The aim underlying the present invention essentially resides in providing an apparatus of the aforementioned type which enables different flow behavior and, optionally, also processing differing physical consistencies such as, for example, solid and fluid or flowable components so as to enable an accurate gravimetric dosing with a minimal constructional cost while nevertheless ensuring an exact mixing ratio.

According to the invention, each weighing container is respectively connected to one storage container and to the mixing means by respective feed lines and, all the weighing containers are arranged in a common weighing frame of the balance. Shut off valves are located in the feed lines between the weighing containers and the mixing means in a vicinity thereof and after determining the total weight in the weighing containers, the components are successively discharged therefrom corresponding to their proportion in the mixing ratio in a subtraction process.

By virtue of the features of the present invention, it is possible to accurately gravimetrically does a basically random number of components of different natures and consistencies in a wide weight range by virtue of the fact that an independent system, with feed lines and weighing containers, is provided for each component between the storage container and the mixing means, so that the systems can be adapted to the nature of the delivery and their construction to the physical characteristics, particularly the flow behavior of the components. The weighing of the individual components takes place in the subtraction process, i.e. it is ensured that only that quantity which has actually left the weighing containers enters the mixing ratio. The precision of dosing is significantly influenced in that the shutoff valves for all the components are positioned near the mixing means, so that, independently of the line length between weighing container and mixing means, which cannot be maintained the same for all components, it is ensured that for all the components the dosing result is not falsified by that product proportion located between the weighing vessel and the mixing means. It is presumed and is so in practice, that the discharge lines are always filled with the particular component. This accurate dosing over a wide weight range only involves limited constructional expenses, because the weighing containers are simple vessels for all of which only a single weighing frame and a single balance are required.

According to a preferred embodiment, the weighing containers are constructed as closed containers and on the feed or charging side are in each case connected to a compressed air source for discharging the components.

Each component is discharged from the weighing container into the mixing means by the compressed air. This is particularly advantageous in the case of difficultly flowing components, particularly high viscosity liquids, because it aids the flow rate and a completely satisfactory outflow into the mixing means is still ensured even in the case of narrow cross-section, without the weighing accuracy being impaired. However, in the case of a purely gravity discharge, it would be necessary to have larger line cross-sections and a corresponding construction (no horizontal or slightly sloping lines, etc.). This feed system also makes it possible to speed up the flow rate, so that the weighing process can be carried out in a period time.

In order to automate the weighing process, the balance for each component can have a desired value indication, which, when reached, shuts off the shutoff valve for the corresponding component, which ensures that the component quantity leaving the weighing container also passes through the shutoff valve and enters the mixing means.

In accordance with still further features of the present invention supply valves are provided in each feed line between the storage container and the weighing container and compressed air valves in each line connecting the weighing container to the compressed air source which, together with the shutoff valves, are located near to the mixing means in a control circuit which, for each component and, optionally in program-controlled manner, successively opens the compressed air valve and shutoff valve at the beginning of a weighing process, closes both valves on reaching the desired value and on reaching the desired value for the last component opens the supply valves for all components, so that the discharge and refilling of the weighing containers can be fully automated manner.

According to an advantageous embodiment, the weighing containers are filled from the storage containers following each dosing process. Thus, there are reproducible conditions for each weighing process, in that for each weighing process the balance uses as a basis and in each case the maximum weight which can be received by all the containers, i.e. is virtually based on a zero setting and can give random weight proportions for each individual component.

Advantageously, in accordance with the present invention each weighing container is provided with a level meter in the form of a full indicator. The level meters can correspondingly control the supply of the product components. Functioning as full indicators, these level meters can automatically interrupt the supply of components.

According to still further feature of the present invention, a return line is provided between each storage container and the weighing container associated therewith and the corresponding product components are supplied to the weighing containers until the total weight of all components is reached on the balance.

Thus, each weighing container is in a circuit and the product component supplied in excess to an individual weighing container passes back through the return line into the associated storage container until the final weighing container is filled with the corresponding product component. This economises the individual disconnection of the filled weighing container and also prevents the overfilling thereof.

An automation of this filling process can be achieved in that the balance has a limit switch which comes into action on reaching the total weight for blocking off the feed lines and stopping the pumps or the like. In order not to impair the delivery of the components from the storage containers by the given pressure in the weighing containers, it is also provided for each weighing container to be connected via a pressure compensating line to the corresponding storage container. The pressure compensation between weighing containers and storage container can also result from the return line acting as the pressure compensating line.

Finally, it is advantageous for all the lines to be provided in the vicinity of the weighing containers with a horizontal, flexible line portion, in order to ensure a free mobility of the weighing containers or frame, and to insulate the weighing mechanism from rebound or reaction forces from the feed or delivery process.

BRIEF DESCRIPTION OF THE DRAWINGS

The single FIGURE of the drawing is a schematic view of an apparatus for gravimetric dosing of flowable product components constructed in accordance with the present invention.

DETAILED DESCRIPTION

Referring now to the single FIGURE of the drawings, three storage containers 1, 2, 3 are respectively connected through a feed line 4, 5, 6 to one weighing vessel or container 7, 8, 9. The feed lines 4, 5, 6 may be constructed as lines in which the components are conveyed in different mechanical manners such as, for example, by compressed air, pumps, or gravity. Optionally the nature of the delivery or conveying can be adapted to the physical characteristics and consistency of the particular component. In the represented embodiment, where it is assumed that all three components are viscous, delivery takes place by pumps 10, 11, 12, which are positioned directly below the storage container. Thus, in the vicinity of weighing containers 7, 8, 9, feed lines 4, 5, 6 contain supply valves 13, 14, 15 by which the supply to the individual weighing containers 7, 8, 9 can be shut off.

The weighing containers 7, 8, 9 are located in a common weighing frame 16 of a balance, having a support 17 and indicator 18. On the discharge side, each weighing container 7, 8, 9 is connected through a line 19, 20, 21 to a mixing means 22 and, in each line adjacent to the latter, is provided a shutoff valve 23, 24, 25. The discharge of components I, II and III from weighing containers 7, 8, 9 can take place in a random manner. However, as shown in the single figure, this preferably takes place by compressed air obtained from a source, e.g. a blower 26 via lines 27, 28, 29 on in each case one weighing container 7, 8, 9. Each of the lines 27, 28, 29 contains a shutoff valve 30, 31, 32. The compressed air acts on the surface of the components in the weighing containers 7, 8, 9, so that each component can be conveyed by pressure into mixing means 22 through line 19, 20, 21.

Each weighing container 7, 8, 9 is provided with a lever meter in the form of a full indicator 33, 34, 35, which ensures that prior to each weighing process the weighing containers 7, 8, 9 are filled to a clearly defined height from the storage containers 1, 2, 3. Finally, each weighing container 7, 8, 9 is connected through a return line 36, 37, 38 to its associated storage container 1, 2, 3 with each return line containing a shutoff valve 39, 40, 41.

In order to insulate or prevent reaction forces from affecting the feed and discharge processes from the weighing mechanism, feed lines 4, 5, 6, discharge lines 19, 20, 21 and return lines 36, 37, 38 are in each case provided with a horizontal line portion in the immediate vicinity of the weighing container. In the immediate vicinity of the weighing container, the horizontal line portion contains a flexible line portion 42, 43, 44, which ensures a free mobility of the weighing frame 16.

Prior to each weighing process, the weighing containers 7, 8, 9 are filled up to the readings of the level meters 33, 34, 35 from storage containers 1, 2, 3 with components I, II, III. The actual weighing process then proceeds in such a way that with supply valves 13, 14, 15 closed, the compressed air valves 30, 31, 32 are opened, so that the weighing containers are under pressure. The balance indicator 18 is in the zero position. Firstly the shutoff vale 23 in the discharge line 19 of weighing container 7 is opened unto component I has been forced out of weighing container 7 in the desired weight proportion and has entered mixing means 22. Shutoff valve 23 is then closed. The same procedure is adopted with components II and III until the weigh proportions of all the components have entered the mixing means 22 in accordance with the mixing formulation. The valves 39, 40, 41 in return lines 36, 37, 38 and supply valves 13, 14, 15 are then opened and pumps 10, 11, 12 are put into operation until the weighing containers 7, 8, 9 have again reached the reading of level meter 33. At optionally different times, each level meter, which acts as a full indicator, switches off pumps 10, 11, 12, so that a new weighing process can be carried out.

According to another embodiment pumps 10, 11 and 12 operate until all the weighing containers 7, 8 and 9 have been filled and then simultaneously switch off. The excess quantity of components I, II, and/or III supplied by pumps 10, 11, 12 is returned to the corresponding storage containers 1, 2, 3 through return lines 36, 37, 38 with the weighing container full and optionally conveyed in circuit form for a long period until finally all the weighing containers are filled and the balance indicates the predetermined total weight. Pumps 10, 11, 12 can be stopped and valves 13, 14, 15 closed by a limit switch or the like.

Weighing and filling can be completely automated by a corresponding desired value indication to the balance for each individual component and by means of a corresponding control circuit, which optionally operates in programmed manner.

What is claimed is:

1. An apparatus for gravimetric dosing of a plurality of flowable product components, with at least one of the flowable product components being a liquid, for producing mixtures with optionally changing weight proportions of the flowable product components, the apparatus comprising a plurality of storage containers, each storage container containing one component of the plurality of flowable product components, means for mixing the flowable product components, a balance means including a common weighing frame and weighing containers respectively connected to the storage containers through feed lines, said mixing means being connected to an outlet of the respective weighing containers, and shutoff valve means for interrupting each a component flow after a weighing process, wherein each weighing container is respectively connected to the mixing means by one feed line, all of the weighing containers are arranged in the common weighing frame of the balance means and the shutoff valve means are located in the feed lines between the weighing containers and the mixing means and, after the common weighing frame determines the total weight in the weighing containers, the component are successively discharged in proportion in a mixing ratio by a subtraction process and wherein each weighing container is provided with a level meter means for providing an indication of a full level.

2. An apparatus according to claim 1, wherein the weighing containers are closed containers and are respectively connected to a compressed air source at one side thereof for enabling a discharging of the flowable product components.

3. An apparatus according to one of claims 1 or 2, wherein the balance means has a predetermine value for each flowable product component and upon reaching the predetermined value the shutoff valve means for the corresponding component is closed.

4. An apparatus according to claim 1, wherein the weighing containers are filled from the storage containers following completion of said successive discharging.

5. An apparatus according to claim 1, wherein each weighing container is connected via a pressure compensating line to the corresponding storage container.

6. An apparatus according to claim 1, wherein all the feed lines between the weighing containers and the mixing means include a horizontal flexible line portion in the vicinity of the weighing containers.

* * * * *